(12) United States Patent
Keene

(10) Patent No.: US 6,541,966 B1
(45) Date of Patent: Apr. 1, 2003

(54) PRECISION METAL LOCATING APPARATUS

(75) Inventor: Mark N Keene, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/719,419

(22) PCT Filed: Jun. 10, 1999

(86) PCT No.: PCT/GB99/01847
§ 371 (c)(1),
(2), (4) Date: Dec. 12, 2000

(87) PCT Pub. No.: WO00/00848
PCT Pub. Date: Jan. 6, 2000

(30) Foreign Application Priority Data

Jun. 27, 1998 (GB) .............................................. 9813889

(51) Int. Cl.⁷ .......................... G01V 3/08; G01V 3/165; A61B 5/06
(52) U.S. Cl. ...................... 324/243; 324/225; 324/232; 324/233; 324/235; 324/247; 324/329; 340/551; 600/550
(58) Field of Search ................................ 324/225, 226, 324/232, 233, 235, 239, 243, 247, 248, 251, 252, 260, 207.17, 326, 329, 345, 346, 67; 340/551; 600/550, 409, 424; 194/317–320

(56) References Cited

U.S. PATENT DOCUMENTS

| 3,826,973 | A | * | 7/1974 | Pflaum ......................... 324/329 |
| 4,646,025 | A | * | 2/1987 | Martin et al. ................ 324/346 |
| 4,837,489 | A | | 6/1989 | McFee |
| 5,119,816 | A | | 6/1992 | Gevins |
| 5,122,744 | A | * | 6/1992 | Koch .......................... 324/248 |
| 5,552,705 | A | * | 9/1996 | Keller ......................... 324/239 |
| 5,629,626 | A | * | 5/1997 | Russell et al. ............... 324/345 |
| 5,642,045 | A | * | 6/1997 | Keefe et al. ............. 324/247 X |
| 5,842,986 | A | * | 12/1998 | Avrin et al. ................. 600/407 |
| 5,891,031 | A | * | 4/1999 | Ohyu .......................... 600/409 |
| 6,204,667 | B1 | * | 3/2001 | Won ............................ 324/329 |

FOREIGN PATENT DOCUMENTS

| WO | 96/11414 | 4/1996 |
| WO | 97/49334 | 12/1997 |

* cited by examiner

Primary Examiner—Gerard R. Strecker
(74) Attorney, Agent, or Firm—Nixon & Vanderhye P.C.

(57) ABSTRACT

Apparatus for detecting a metal object comprises a transmitter for generating a pulsed or an alternating magnetic field in the vicinity of the metal object to be detected and a detector for detecting the secondary magnetic field induced in the metal object by the transmitted magnetic field. The detector measures at least three magnetic field gradient components of at least first order of the secondary magnetic field. The apparatus also comprises a processor for determining at least one of the position or the electro-magnetic cross-section or an estimate of the shape of the metal object from the measured magnetic field spatial gradient components. The processor fits the measured components to dipole, multiple dipole, multipole, or extended source models. In a preferred embodiment, the invention may comprise three or more pairs of gradiometric coils, or other sensing means. The detector measures at least five magnetic field gradient components of at least first order, and one or more components of the secondary magnetic field. The detector may be coils, or any other magnetic sensors. The processor enters pre-determined criteria to discriminate against detection of metal objects of no interest or to selectively detect metal objects of interest.

34 Claims, 6 Drawing Sheets

PRECISION METAL LOCATING APPARATUS

BACKGROUND OF THE INVENTION

1. Field of the Invention

This invention relates to an apparatus for detecting metals. In particular, the metal detector may be used for locating buried metal objects or for locating foreign metal objects in a human or animal body. The apparatus can provide the user with a location and some information on the shape and form of the detected metal.

2. Discussion of Prior Art

The term, 'metal detector' usually refers to a class of instruments where a coil is energised with a changing electrical current which induces small "eddy currents" in any nearby metal through a process of magnetic induction. The induced eddy currents have their own associated magnetic fields that are detected, usually with coils, mounted on the detector. There are two main types of metal detector; the pulse-induction (p-i) and the continuous wave.

Pulse-induction (p-i) detectors use a square wave (or alternative shape which has a sharp edge) signal in the transmitter coil. The high rate-of-change of magnetic field creates a voltage pulse in any nearby metal. This pulse generates an eddy current which decays in time. The receiver coil is gated to look for the eddy current associated with this decay at a specified time, and for a specified duration, after the edge in the transmit cycle.

Continuous wave (c/w) detectors use a sinusoidal a.c. electrical current in their transmitter coil to establish an a.c. magnetic field. A receiver coil, which is sensitive to signals at the same frequency as the transmitter signal, detects the presence of eddy currents within any nearby metal. There are difficulties with the transmit signal being directly detected by the received coil. Several configurations of this c/w mode of operation have been developed to overcome this.

One configuration which helps to overcome this direct pickup of the transmitter coil is to use orthogonal transmitter and receiver coils. Precise alignment and highly stable mounting of the coils is required to achieve nulling of the transmitted field. Another approach is to use a receiver coil which is topologically a figure of eight, and is sensitive only to differences in field between the two halves. This differencing arrangement can be balanced to null out the transmitter signal. The differencing coil technique has a small advantage over the orthogonal coil method in that it is slightly more accurate at indicating when the detector is directly over the metal. C/w instruments are able to discern ferrous from non-ferrous metals by measuring the relative phase of the received signal with respect to the transmitted one.

Both of these types of metal detector indicate whether there is a metal present in a relatively large volume of space around the coils. This limits the number of applications for metal detectors to those where accurate location of the metal is not required. In some instances, such as in airport security systems, a person walks through a metal detector "doorway". If a metal is detected then security personnel conduct a detailed search with a small hand-held detector to localise the metal. This is somewhat intrusive and time-consuming and only possible because the small detector can get very close to the metal. Also, this simple "YES-NO" detection gives the user no information about the shape of the metal. These factors can lead to a high false alarm rate in circumstances where the user wishes to find particular types of metallic items.

In German patent DE 3713363, a metal detector is described in which c/w operation with differencing receiver coils and ferrous/non-ferrous discrimination. This represents a significant improvement on many previous configurations but only provides the user with limited information on the metal it detects. The additional information it provides over more basic detectors is a slight improvement in discerning the position of the metal and the ferrous/non-ferrous discrimination from the phase information.

However, it some instances it may be desirable to learn additional information about the metal, in particular an accurate location and an estimate of its size and shape. This cannot be achieved using the prior art. Only ferrous and non-ferrous metals can be distinguished. It is an object of the present invention to provide an apparatus for detecting metals which overcomes the limitations of the prior art and which has the ability to locate accurately and quantify the electro-magnetic cross section of a metal.

SUMMARY OF THE INVENTION

According to the present invention, an apparatus for detecting a metal object having a shape, an electro-magnetic cross-section and a location comprises;

transmitter means for generating a magnetic field in the vicinity of the metal object to be detected, thereby inducing currents within the metal object, the induced currents generating a secondary magnetic field, detection means for detecting the secondary magnetic field, characterised in that the detection means comprise means for measuring at least three magnetic field gradient components of at least first order of the secondary magnetic field and further characterised in that the apparatus comprises processing means for determining at least one of the location, an electro-magnetic cross-section or an estimate of the shape of the metal object from the measured first order magnetic field gradient components.

This invention provides two distinct advantages over prior art metal detectors. A more accurate location of a detected metal is obtained, which may be output as coordinates once the metal has been detected. Measurement of an electro-magnetic cross-section, that is a function of the shape and composition of the metal, provides a further advantage in that it may be used as a means of providing discrimination against the detection of metal objects of a certain type which are not of interest to the user. Alternatively, or in addition, metal objects of a particular type and known electro-magnetic cross section or shape can be looked for in particular. For example, archaeological items such as coins may be positively distinguished and can ring-pulls may be discriminated against.

The apparatus may comprise means for generating a pulsed or an alternating magnetic field and a computer inversion algorithm for calculating the properties of the detected metal.

In one embodiment of the invention the apparatus may comprise means for measuring at least five magnetic field gradient components of at least first order and sensing means for measuring one or more component of the secondary magnetic field. These are to provide the inversion algorithm with enough data to compute the target properties. The sensing means may be any one of a coil, a Super-conducting Quantum Interference Device (SQUID), a fluxgate, a Hall probe, a magneto-resistive device or a magneto-impedance device. It may be preferable to include three sensing means in the apparatus, each oriented to sense the magnetic field component in a different orthogonal directions. This means that the transmitted magnetic field may be transmitted in any of three orthogonal directions, with the appropriately oriented sensing means being used to measure the required secondary magnetic field component.

In another embodiment of the invention, the apparatus may comprise means for measuring at least three magnetic field gradient components of second order.

The apparatus may comprise at least three pairs of gradiometric receiver coils, each pair for detecting a different first order magnetic field gradient component, each of the gradiometric coil pairs having a baseline, d. Alternatively, the apparatus may comprise at least three pairs of any one of SQUIDs, fluxgates, Hall probes, magneto-resistive devices or magneto-impedance devices, each pair for detecting a different first order magnetic field gradient component, each of the pairs having a baseline, d. Preferably, the baseline is no greater than the distance between the metal to be detected and the means for measuring the magnetic field gradient components. The preferred baseline will depend on the particular application for which the apparatus is required.

For example, the apparatus may be used locating a metal object buried beneath the surface of the earth or for characterising and, or deducing the shape of a metal object buried beneath the surface of the earth. In this case, typically the baseline may be no more than 20 centimeters. This embodiment of the invention may be used in combination with Ground Penetrating Radar (GPR) apparatus or Nuclear Quadrupole Resonance (NQR) apparatus.

Alternatively, the apparatus may be used for locating a metal object within a human or animal body or for characterising and, or deducing the shape of a metal object on or within a human or animal body. In this case, typically, the baseline may be no more than 5 centimeters. For location or characterisation of a metal object on or within a human or animal body, the apparatus may also comprise a host system. The host system may be an ultra-sound scanning apparatus or an X-ray imaging apparatus.

The transmitter means may comprise a pulsed or an alternating current source and at least one transmitter coil. For example, the apparatus may comprise at least two transmitter coils, wherein the two or more transmitter coils are arranged to generate a magnetic field in substantially orthogonal directions. The transmitter means may also be arranged to generate a magnetic field at at least two frequencies. This provides the advantage that more than one electro-magnetic cross-section of the metal may be detected. Alternatively, three transmitter coils may be included in the apparatus, each oriented orthogonal to the others, thereby enabling the direction of the transmit field to be varied.

The processing means may include means for entering pre-determined criteria to provide a discrimination means against detection of metal objects of no interest. Alternatively, or in addition, the processing means may include means for entering pre-determined criteria to provide a discrimination means to selectively detect metal objects of interest. This provides the further advantage that metal objects of known electro-magnetic cross-section and, or shape which are not of interest to the user may be discriminated against in software if they have a known electro-magnetic cross-section e.g. can rings.

The detection means generate at least three gradient outputs corresponding to the three or more measured magnetic field gradient components. The apparatus may further comprising phase detection means for determining the relative phase between the three or more gradient outputs and the magnetic field generated by the transmitter means, such that the relative phase provides a discrimination means or an additional discrimination means between metal objects of different type.

According to another aspect of the invention, a method for detecting a metal object having a shape, an electro-magnetic cross-section and a location comprises the steps of;

(i) generating a magnetic field in the vicinity of the metal object to be detected, the magnetic field being any one of a pulsed or an alternating magnetic field, thereby inducing currents within the metal object, the induced currents generating a secondary magnetic field, (ii) detecting the secondary magnetic field, characterised in that the method comprises the further steps of;

(iii) measuring at least three magnetic field gradient components of at least first order of the secondary magnetic field and (iv) determining at least one of the location, an electro-magnetic cross-section or an estimate of the shape of the metal object from the measured magnetic field gradient components using processing means.

The invention may comprise the further step of entering predetermined criteria to the processing means to provide a discrimination means against detection of metal objects of no interest. Alternatively, or in addition, the invention may comprise the further step of entering predetermined criteria to the processing means to provide a discrimination means to selectively detect metal objects of interest.

BRIEF DESCRIPTION OF THE DRAWINGS

The invention will now be described, by way of example only, with reference to the following figures in which.

DETAILED DISCUSSION OF EMBODIMENTS

By way of background, the basic principles of conventional p-i and c/w detectors will be described with reference to FIGS. 1 and 2 respectively. For the purpose of this specification, the phrase "detection of a metal" is taken to mean that a metal is observed to be within a relatively large volume of space whereas the term "location of a metal" is used to mean a more precise indication of the metals position within the larger volume.

Figure 1:
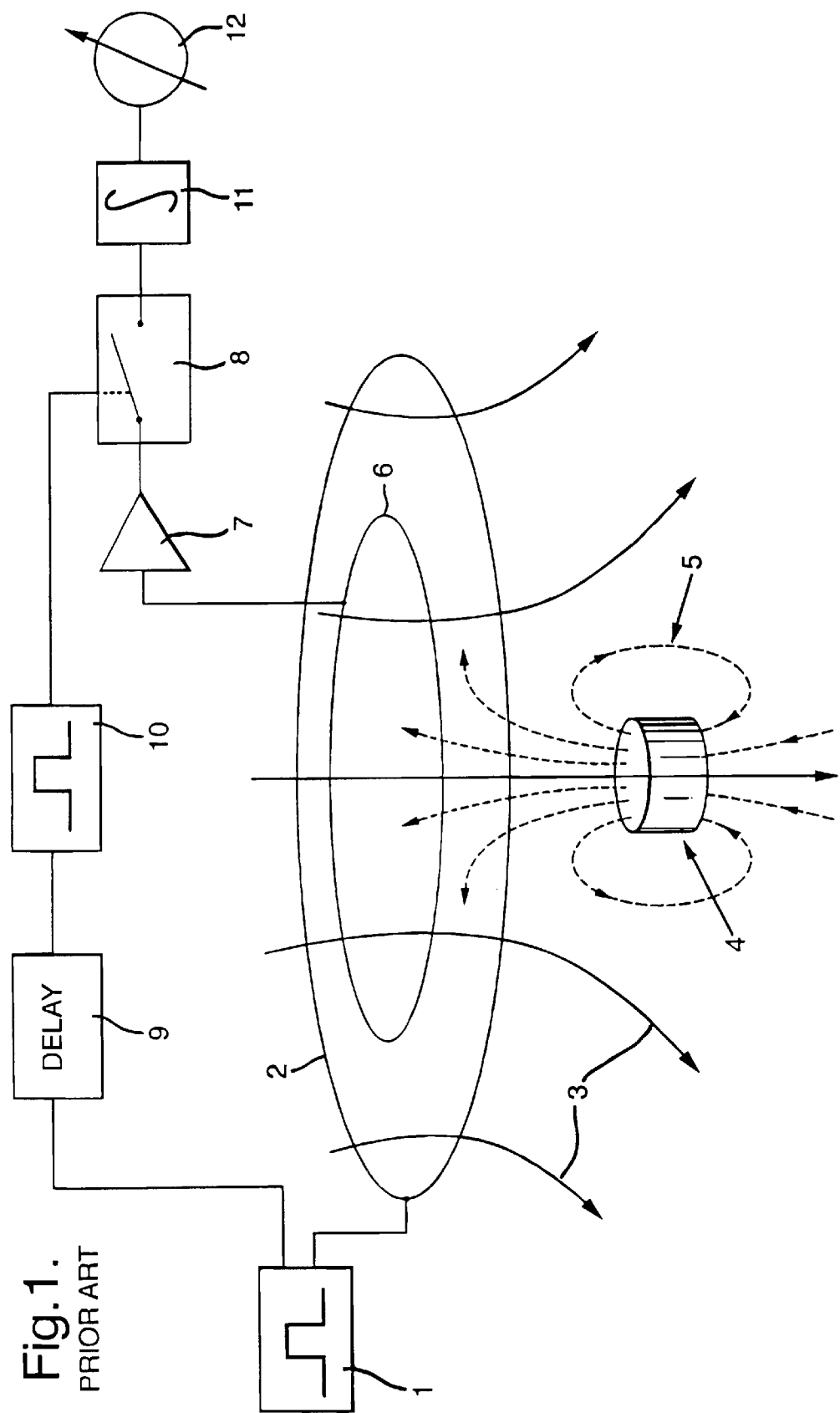
FIG. 1 shows a schematic diagram of a known pulse-induction (p-i) metal detector.

Referring to FIG. 1, a conventional p-i detector uses a pulse generator 1 to apply a current pulse to a transmitter coil 2. This generates a pulsed magnetic field 3 which may fall incident upon a metal 4. If so, the metal 4 will be induced with an eddy current which will decay to zero some time after the energising pulse has switched. This decaying eddy current will generate a secondary magnetic field 5 (shown as a dashed line) which may thread the receiver coil 6 and be amplified by an amplifier 7. This signal is passed through a gate 8 which is opened for a short time after the energising pulse has switched. This may be accomplished by using a time delay 9 which is triggered by the pulse from the transmitter 1, and a pulse generator 10 to specify the length of time for which the gate 8 is open. The function of the gate 8 is to block the directly received transmitter pulse and yet sense the low level secondary field 6 decays with time. The output of the gate 8 is integrated using an integrator 11. The integrator 11 sums the cumulative signal over several pulses and outputs this signal to a meter 12 or other indicator.

Figure 2:
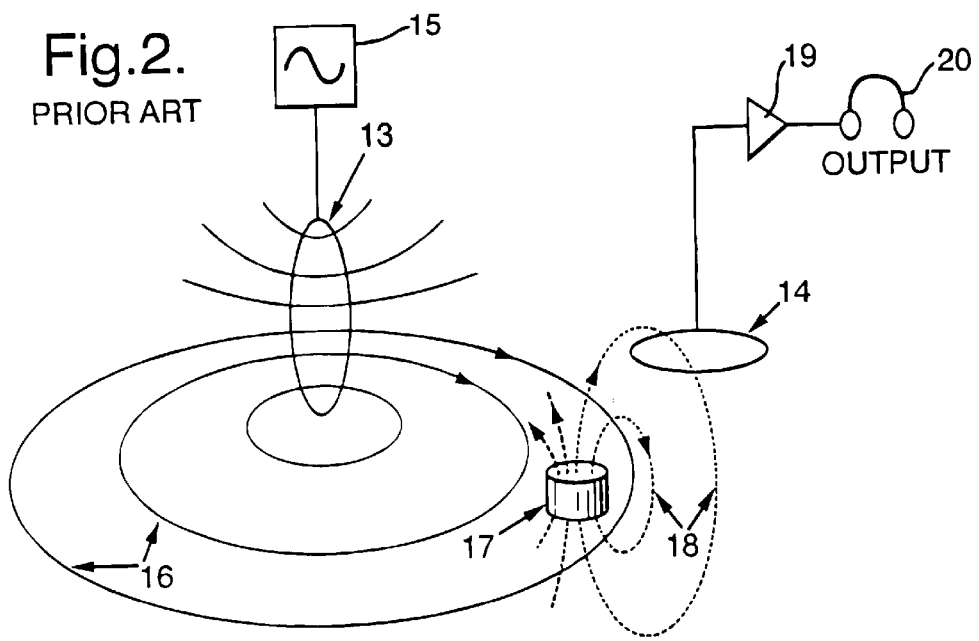
FIG. 2 shows a schematic diagram of a known continuous-wave (c/w) metal detector.

Referring to FIG. 2, a conventional c/w detector comprises a transmitter coil 13 and a receiver coil 14. The transmitter coil 13 is supplied by an alternating current from an oscillator 15. In this example the receiver coil 14 is arranged in an orthogonal direction to the transmitter coil and positioned so that in the absence of a metal no net magnetic field 16 threads it. When there is a metal 17 present the induced current establishes a secondary field 18 (shown as dashed lines) which is received by the receiver coil 14, amplified by an amplifier 19 and output at 20.

A more advanced c/w detector which is known in the prior art is described in DE 37 13 363 A1. This detector has several improvements over the system described previously. One improvement is a "figure of eight" wound receiver coil, which is in the same place as the transmitter coil, which only measures the difference in field between the two halves. This can be mounted within the transmitter coil for compactness and gives slightly improved spatial resolution of the metal than the original receiver coil. Another improvement is that dual frequencies of operation and phase sensitive detection of the output give rise to discrimination between ferrous and non-ferrous materials.

There are several prior art inventions that are similar in principle including those detailed in patents U.S. Pat. Nos. 3,826,973, 4,542,344, 5,670,882, WO 95/08130 and WO 96/11414.

For some applications, it may be desirable to locate a metal object more accurately or to characterise the metal being detected more fully. For example, it may be advantageous to determine an accurate location of the metal in three dimensions or the electro-magnetic cross-section, which is a function of the electrical conductivity, the magnetic permeability and the shape. The ability to locate a metal accurately would be advantageous for finding metallic foreign bodies in non or poorly conducting media e.g. gunshot pellets in animals or for quality control in food production. The ability to determine the electro-magnetic cross-section would be useful for discriminating against false alarms if used to find specific types of objects which are buried underground or behind walls.

The present invention relates to a metal detector that has the ability to locate accurately, and quantify the electro-magnetic cross section of a metal (the electro-magnetic cross-section of a metal is a function of shape, conductivity and permeability of the metal). This provides an advantage over known metal detectors, which cannot characterise metals in this way. It is primarily the arrangement of the receiver coils and the use of signal processing which leads to the ability to locate and characterise the detected metal.

The detector can be based on either c/w or p-i method of operation. The description of the invention concentrates on the preferred c/w method because this maintains the additional advantage of being able to discriminate between ferrous and non-ferrous metals.

The object of the invention is to measure the spatial properties and distribution of the secondary field so that the properties and positional information of the metal from which they originated may be deduced and output to the user.

The apparatus comprises magnetic field sensing means for measuring magnetic field gradient components of at least first order. In a preferred embodiment, this measuring means may be several gradiometric pairs of receiver coils. Gradiometric pairs of receiver coils (referred to as "gradiometric coils") are coils wound in opposite polarity and usually wired in series so uniform magnetic fields create equal and opposite signals which cancel. Gradiometric coils are insensitive to the amount of magnetic field which is common to both coils in the pair. They are, however, highly sensitive to the differences in field between the coils in the pair. A field difference divided by the distance between the points where the difference is measured is the field gradient (often referred to as the first order gradient). Because gradiometric pairs of coils are insensitive to uniform or common fields, they are therefore insensitive to the transmit signals which can be arranged to be the same in both coils of the pair.

The number of spatial gradients which need to be measured depends on the application. For example, in order to locate the three dimensional position of a metal in a non-conducting media, five gradients and one field component need to be measured. If the metal is in a conducting media then eight gradients are required. In some circumstances fewer than five gradients may be measured. For example where the position and orientation of the detector is changing with time, measurements at two or more positions or at two or more different times provide extra information. The minimum number of gradients that may be required is three.

Looking at this in more detail, the nine components to a gradient field are;

$$\begin{pmatrix} \frac{\partial B_x}{\partial x} & \frac{\partial B_x}{\partial y} & \frac{\partial B_x}{\partial z} \\ \frac{\partial B_y}{\partial x} & \frac{\partial B_y}{\partial y} & \frac{\partial B_y}{\partial z} \\ \frac{\partial B_z}{\partial x} & \frac{\partial B_z}{\partial y} & \frac{\partial B_z}{\partial z} \end{pmatrix}$$

If all nine are measured then the properties of the source generating them may be deduced mathematically with a computer. In the case where the apparatus operates in a non-conducting environment, there are constraints imposed by Maxwell's equations so that not all of the nine gradients need to be measured. These constraints render the matrix traceless and symmetric leaving only five independent gradients, $$\begin{pmatrix} \frac{\partial B_x}{\partial x} & - & - \\ \frac{\partial B_y}{\partial x} & \frac{\partial B_y}{\partial y} & - \\ \frac{\partial B_z}{\partial x} & \frac{\partial B_z}{\partial y} & - \end{pmatrix}$$

i.e. the remaining four gradients can be reconstructed from knowledge of the independent five. Within a conducting medium the matrix is traceless but non-symmetric so eight gradients are required.

The following description assumes that measurements are made in a non-conducting media, requiring five gradients to be measured to fully characterise the induced source.

Figure 3:
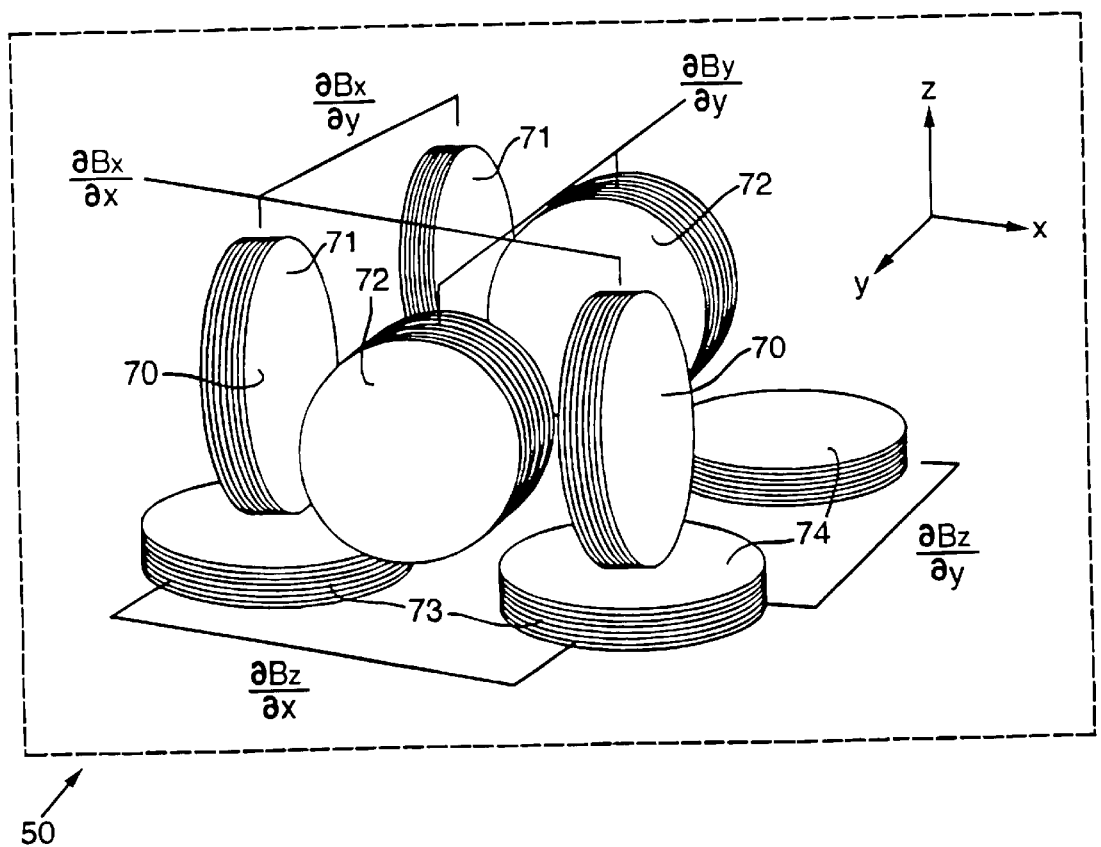
FIG. 3 shows a schematic diagram of an embodiment of the gradiometric coils which may be used in the present invention.

Referring to FIG. 3, an arrangement 50 of gradiometric coil pairs which may be used in the invention comprises five sets of gradiometric coil pairs, 70–74, each for measuring a different one of five independent first order magnetic field gradients. There are five independent gradients to a field in a non conducting media so five sets of coil pairs, aligned in different orientations, are required to fully characterise the field. The gradiometric pairs of coils 70–74 are arranged to measure different gradient components of the secondary field; dBx/dx, dBx/dy, dBy/dy, dBz/dx and dBz/dy. As shown in FIG. 3, it is clear that a coil in one coil pair (e.g. 70) may also form part of another coil pair (e.g. 71). In some cases it may be preferable to arrange the gradiometric pairs of coils symmetrically about one point, so that the centres of each pair of coils coincide at substantially the same point. This is not the case in the arrangement shown in FIG. 3 where the centres of each pair of coils are at different points.

If five gradients are measured, one field component also needs to be measured to locate the three dimensional position of the metal to be detected. This field component may be measured with any sensing means (not shown in FIG. 3). For example, this may be a single coil orthogonal to the transmitter coil to prevent the single coil being swamped by the transmitted field. Alternatively, three coils, each oriented orthogonal to the other two, may be used in the arrangement. This means the direction of the transmitted field can be varied. Other sensors, such as Hall probes, fluxgates, Superconducting Quantum Interference Devices (SQUIDs), magneto-resistive or magneto-impedance devices may also be used to measure the required field component.

The separation of the coils in each pair 70–74 is relatively small so the received signal usually approximates to the spatial gradient of the incident field. The separation of each pair of coils in a gradiometric pair shall be referred to as the baseline. More generally, the distance between any two magnetic sensing means used to measure a magnetic field gradient component shall be referred to as the baseline (other magnetic sensors may be used in the apparatus, instead of gradiometric coils, as will be described later).

Figure 4:
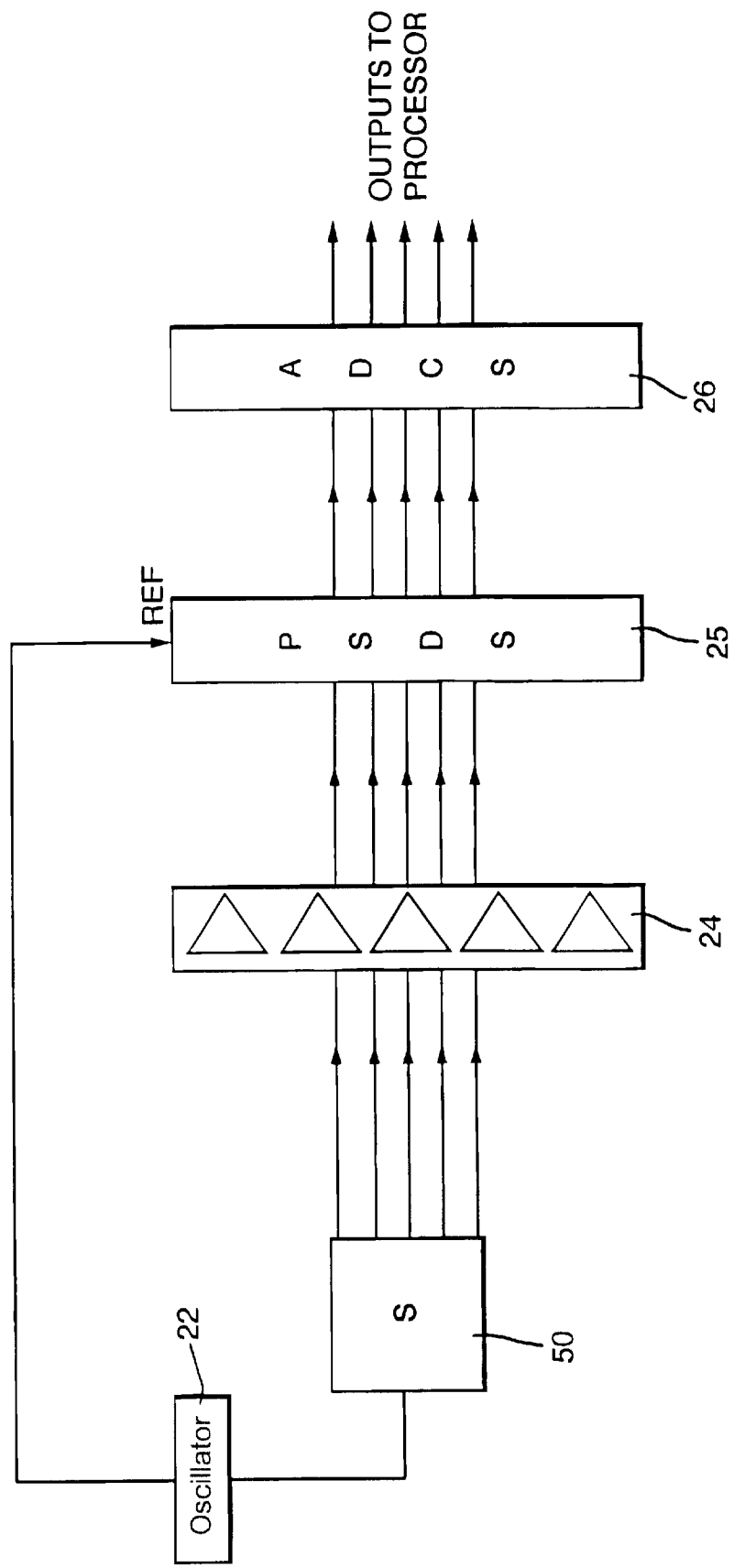
FIG. 4 shows a diagram of the apparatus which may be used to amplify and phase sensitively detect the outputs from the gradiometric coils prior to computer processing.

FIG. 4 shows a diagram of the apparatus which may be used for processing the gradiometric coil outputs, prior to numerical computation by a computer. FIG. 4 relates to an embodiment of the invention based on c/w operation. An a.c current source 22 drives a transmitter coil (not shown), and the arrangement of gradiometric coil pairs 50 produces five gradient measurements. The transmitter coil may typically be located within or surrounding the gradiometric coil arrangement 50.

The outputs from each of the gradiometric pairs of coils within the arrangement 50 may be amplified by amplifiers 24, one for each gradient measurement, phase sensitively detected by phase sensitive detectors 25, one for each gradient measurement, and digitised at ADCs 26 for numerical computation. The purpose of the amplifiers 24 is to boost the voltage across the gradiometric pair to a level suitable for analogue to digital conversion. The purpose of the phase sensitive detectors 95 is to detect the amplitude of the gradient signal at the frequency of the transmitted field which is at some pre-determined phase. Phase sensitive detectors may alternatively be known as lock-in amplifiers, phase-sensitive demodulators, suppressed carrier AM demodulators or synchronous AM demodulators. The outputs from the PSDs 25 are then passed to analogue to digital converters 26 where they are digitised for further processing by a computer in order to achieve the desired characterisation.

In a preferred embodiment, a dual phase sensitive detector may be used with phases set 90° apart. This will allow the phase of the secondary field to be deduced within the computer processing means without the need for manually adjusting the reference phase. Circuit design examples for a suitable amplifier and a phase sensitive detector may be found in the following reference; "Handbook of operational amplifier circuit design", D. F. Stout, McGraw-Hill Book Company, 1976 ISBN 0-07-061797-X.

If p-i illumination is used then the gradient signals would be integrated as in the prior art, rather than phase sensitively detected, before passing to the ADCs.

After amplification and detection, the signals that are proportional in amplitude to the gradients may be digitised in order to be processed in a computer.

The five gradient signals may then be "inverted" in a computer algorithm to yield the three-dimensional position of the metal and its electromagnetic cross-section. This process of measuring the independent field gradients of induced currents in a metal and inverting them to characterise a metal is unknown in the prior art.

There are two types of algorithm which could be used to invert the gradient signals. Both are well known in the prior art for inverting d.c. ferromagnetic dipoles. The first will be referred to as direct inversion, or single point-by-point inversion. This technique directly computes the properties of a dipole source. Details of such techniques may be found on the following references; W. Wynn et al., "Advanced Superconducting gradiometer/magnetometer arrays and a novel signal processing technique, IEEE Trans. Mag. Vol. 11, p 701 (1975), W. M. Wynn, "Inversion of the DC magnetic field and field derivative equations for magnetic and electric current dipoles", Technical report NCSC TR 362-81 (July 1981, Naval Coastal Systems Center, Panama City, Accession no. U23665B). The second is a multi-parameter fit to the gradient data, such as a routine based on least-squares fitting. Details of multi-parameter fitting routines which may be used may be found in the following references; W. Wynn, "Magnetic dipole localisation using gradient rate tensor measured by a 5-axis magnetic gradiometer with known velocity", SPIE vol. 2496/357–367; T. R. Clem (code R22), "Advances in the magnetic detection and classification of sea mines and unexploded ordinance, Symposium: Technology and the mine problem, Nov. 21, 1996, Naval postgraduate school, Monterey, Calif.

The principle of multi-parameter fitting is that a mathematical model of the target is programmed into the algorithm. In this case it is a dipole model. The algorithm selects an arbitrary starting position, strength and orientation for the "model" dipole and calculates the expected gradients and fields at the receiver. These are then compared with the actual measured gradients and fields. The position, strength and orientation of the model are then adjusted incrementally to find the best fit to the real data by a least-squares-fit method, The position, strength and orientation of the model is the best estimate of the real properties of the target metal.

In addition, an Adaptive Signal Processing Algorithm (ASPA) may be used to extract the required information from the measured magnetic field gradients. The principle of ASPA has been used for adaptive beam forming in phased array antennas. Further details may be found in International Patent Application PCT GB98/00685 which issued as U.S. Pat. No. 6,339,328 on Jan. 15, 2002. The ASPA may be adopted in circumstances where there are significant offsets in the gradient signals due to poor balance of the gradiometric coils within each pair and, in particular, where the balance may change slowly over time or where the orthogonality is poor or changeable. The ASPA "learns" about these deficiencies and adaptively corrects the process.

Multi-parameter fitting is computationally more intensive as it involves the minimisation of a function with a large number of variables. It does, however, allow one to resolve multiple targets. In the case where the metal is large or distributed, direct inversion will not work and multi-parameter fitting is the only solution. In practice, therefore, it may be preferable to operate with both algorithms.

By way of example, if the detected metal is small then the secondary field at the detector will behave as a classic oscillating dipole source. The fields and gradients from dipoles are well known and the following information may therefore be deduced from them; (i) the direction to the dipole (2 angles) (ii) the orientation of the dipole (2 angles) and (iii) the strength of the dipole. The strength is a function of the dipoles magnetic moment and the distance between the sensor and dipole. To separate these an extra piece of information is required. For example, this may be one field component or a measurement of the field gradients at some other position. The process of deducing dipole properties from gradiometric measurements in known in relation to steady ferro-magnetic sources i.e. permanent magnetic materials but is unknown in the prior art for induced oscillating dipoles.

From (i) and (iii) above the three dimensional location of small metals can be deduced. This provides an advantage over conventional metal detectors which only detect the presence within a large volume around the detector. From (iv) the dipole strength can provide discrimination. The deduced moment is a function of the shape, conductivity and permeability of the metal as well as the applied field. As the applied field is known at all points in a non-conducting space (and one knows where the dipole is) this function of shape, conductivity and permeability is characteristic of the metal object. The function of shape conductivity and permeability shall be referred to as the "electromagnetic cross section". This characterisation can provide good discrimination against false alarms if the user is looking for metals of specific cross sections or shape or to reject metals of specific cross-section or shape. An example of the former would be to seek buried metal items which were mass produced, i.e. have identical cross sections, like a particular coin. The user may also wish to specifically reject 'standard' false alarms such as drinks can rings.

Figure 5:
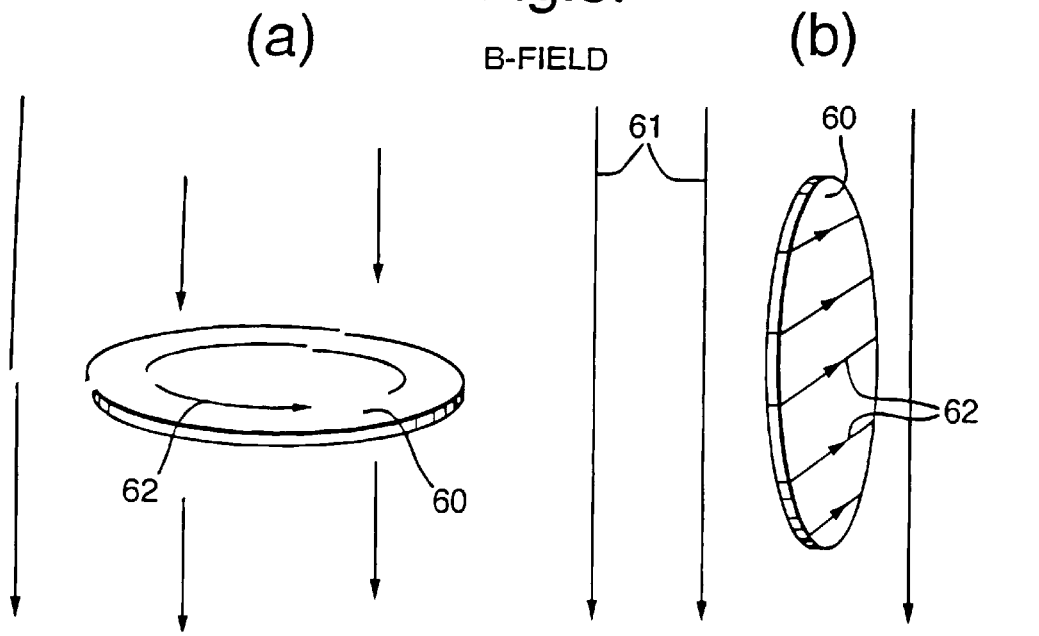
FIG. 5 shows metal coins oriented in different, orthogonal directions in an applied magnetic field.

Unless the metal is strictly spherical and isotropic the electromagnetic cross section will differ with different directions of magnetic illumination. For example, referring to FIG. 5, a coin 60 will have a very different electro-magnetic cross-section if it is edgeways on to the applied field 61 then if it is facing the field. The eddy currents 62 induced in the coin 60 in each of these two situations are shown. For this reason it may be advantageous to transmit fields 61 in several directions in order to fully characterise the metal being detected. By doing this an idea of the actual shape can be deduced. For example, if transmit signals in two orthogonal directions are transmitted, this enables the cross-section in two orthogonal directions to be deduced. This gives a more accurate indication of the shape of the metal being detected. Similarly, if a transmit signal in a third direction is transmitted this enables information on the cross-section in a third direction to be deduced. Transmitting signals in three orthogonal directions enables an estimate of the approximate shape of the metal in three-dimensions to be deduced. Information on the shape of the metal may be of benefit when discriminating against false alarms.

In addition to measuring all gradient components and transmitting multi-orientation fields to deduce shape, electro-magnetic cross section, and position, one can also use techniques known in the prior art to improve discrimination further. For example, multiple or swept frequencies may be used for the transmitted field and phase sensitive detection used to discriminate between ferrous and non-ferrous metals.

In the metal detectors described in patents DE 3713363, U.S. Pat. Nos. 5,670,882, 5,406,259, 4,719,426, 5,633,583, and 3,826,973, "gradiometric" or "differencing" coil sets are used. The main difference between the present invention and the prior art is now described.

The present invention utilises a computer algorithm to calculate and indicate to the user the position of the metal (with respect to the sensor) and some properties of the metal defined as the electromagnetic cross section. To provide this "inversion" algorithm with enough information to perform this operation requires the measurement of five gradient components and one field component (although in special circumstances fewer gradients may be required).

The invention is described with reference to the use of gradiometric coils. However, any magnetic sensing means may be used to measure the magnetic field gradient components, and not just the gradiometric coil pairs, providing the baseline distance no greater than the working distance, and preferably is sufficiently small compared to the working distance. For example Superconducting Quantum Interference Devices (SQUIDs), fluxgates, Hall probes magneto-resistive or magneto-impedance devices may be used to measure each of the gradients required to fully characterise the field.

As well as measuring first order gradients, the invention may also be configured to measure second order gradients. Not all of these second order gradients would be required to obtain position or metal characterisation information, depending on the particular application for which the apparatus is used (e.g. the particular conducting medium and other information which can be obtained). The outputs from the gradiometric coils, or other sensing means used to measure the gradients, are processed in software as discussed previously to obtain the required information.

The gradiometric coil pairs, or other sensing means, may be arranged in two or more arrangements in order to measure the required gradients. For example, it may be preferable to configure two separate arrangements of gradiometric coils (e.g. two pairs in one arrangement, three pairs in another), each pair for measuring a different one of five independent gradients. Alternatively, two arrangements each of five gradiometric coil pairs may be used for improved accuracy.

The preferred embodiment of the present invention will depend upon the particular application for which the apparatus is required. Three example applications (A–C) are described below.

(A) Detection of buried metals

Figure 6:
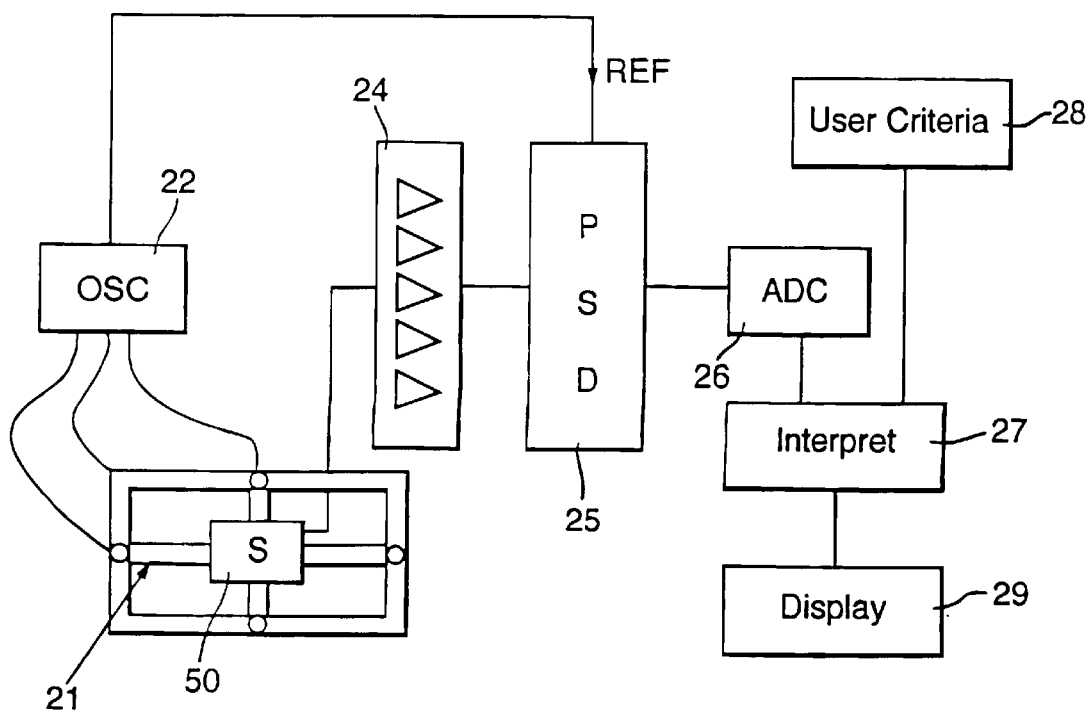
FIG. 6 shows an embodiment of the invention which may be used for locating and characterising buried metal objects.

For this application discrimination is of primary importance and precise location is secondary. High discrimination will result in lower false alarms and therefore faster searches. One embodiment of the invention which may be used for this application is shown in FIG. 6. The detector comprises multiple transmitter coils 21 arranged in substantially orthogonal directions so that all cross-sections of the metal to be detected may be interrogated, as described earlier. The coils 21 are driven from an a.c. current source 22. They coils may transmit either sequentially or simultaneously with phase differences between fields transmitted in orthogonal directions to sweep the transmitted field direction. The transmitted signals may be single or multiple frequency or may be swept in frequency.

The receiver coils 50 may be mounted within the transmitter coils and may be configured as shown in FIG. 3. The gradiometer outputs are amplified by amplifiers 24, one for each gradient measurement, and phase sensitively detected using phase sensitive detectors (PSDs) 25, one for each gradient measurement. The transmitter oscillator 22 provides the reference signal to the PSDs. Phase sensitive detection may be single or dual phase. Low frequency signals emerging from the phase sensitive detectors may then be digitised using ADCs 26 and may be pass to a computer processor where data inversion and interpretation algorithms 27 operate. User criteria are selected in software 28 and are input to the interpretative software 27 so that specific targets may be selected or rejected. For example, if coins are being looked for, known characteristics of other objects, such as can ring pulls, may be used as a veto against false detection. Alternatively, or in addition, objects having a known electro-magnetic cross-section or shape may be positively selected in the software 28. The results from may then be displayed on a monitor 29.

Typically, if metal objects are to be detected beneath the surface of the ground, the baseline may be between 5–15 centimeters, depending on the depth at which the objects are likely to be located. This baseline is a few times smaller than the typical distance between the receiver coils and the metal.

This embodiment of the apparatus may be used in combination with other detection means, such as a Ground Penetrating Radar (GPR) apparatus or Nuclear Quadrupole Resonance (NQR) apparatus.

(B) Location of metallic objects on or within the human or animal body

Figure 7:
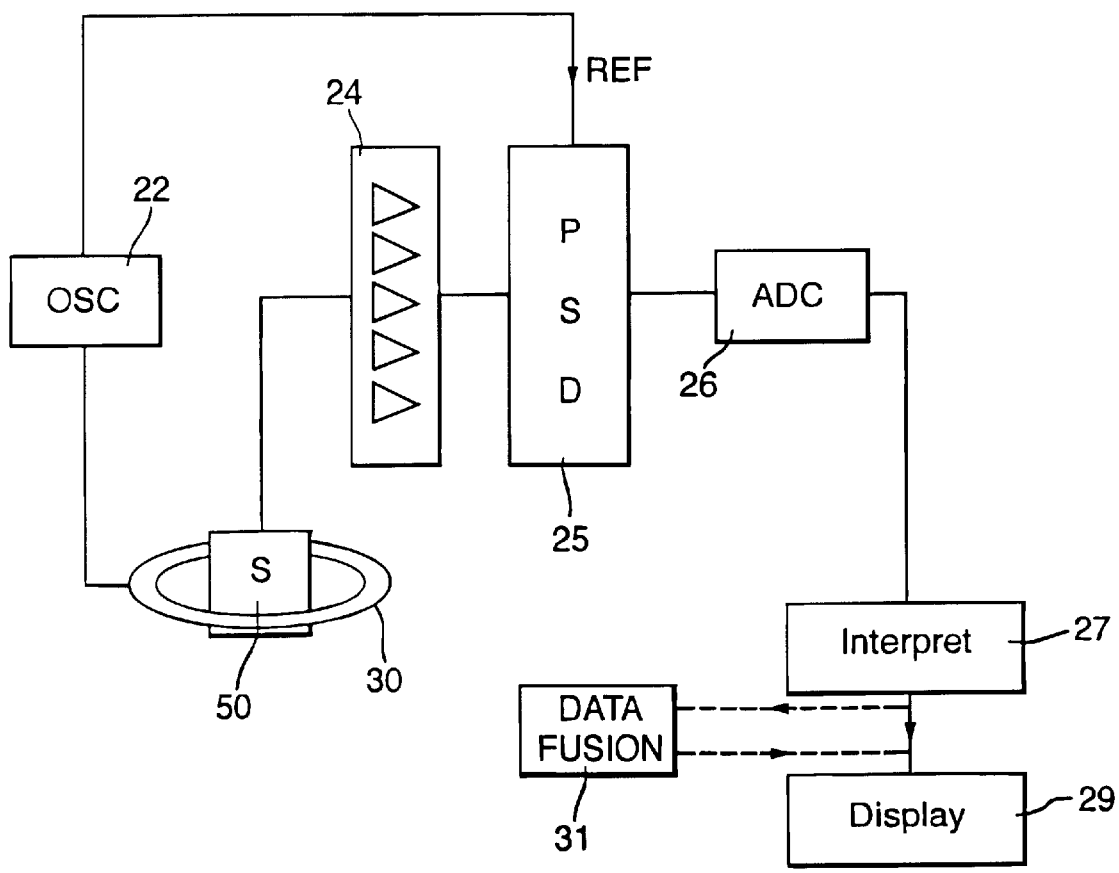
FIG. 7 shows an embodiment of the invention which may be used for locating foreign metal objects in a human or animal body.

This application may assist with the medical diagnosis of wounds where foreign metallic bodies may be present. Examples may include location of bullets or shrapnel or swallowed metals. Here the most important factor is accurate location, rather than characterisation. The embodiment described here may be a stand alone instrument or a sub-system of another diagnostic instrument e.g. ultra-sound scanner or X-ray tomography machine. An embodiment of the invention which maybe used for an application where 'location only' is deemed sufficient is shown in FIG. 7.

This embodiment requires only one transmitter coil 30 driven from an oscillator 22. The transmitter coil 30 may be smaller than for application A above because the maximum working distance is limited to the furthest distance the metal can be from the skin (in a human this is approximately 15 cm). As described previously, the signals from the receiver coils 50 are passed through amplifiers 24, phase sensitive detectors 25, ADCs 26, and then the interpretative software 27 and display 29.

Figure 8:
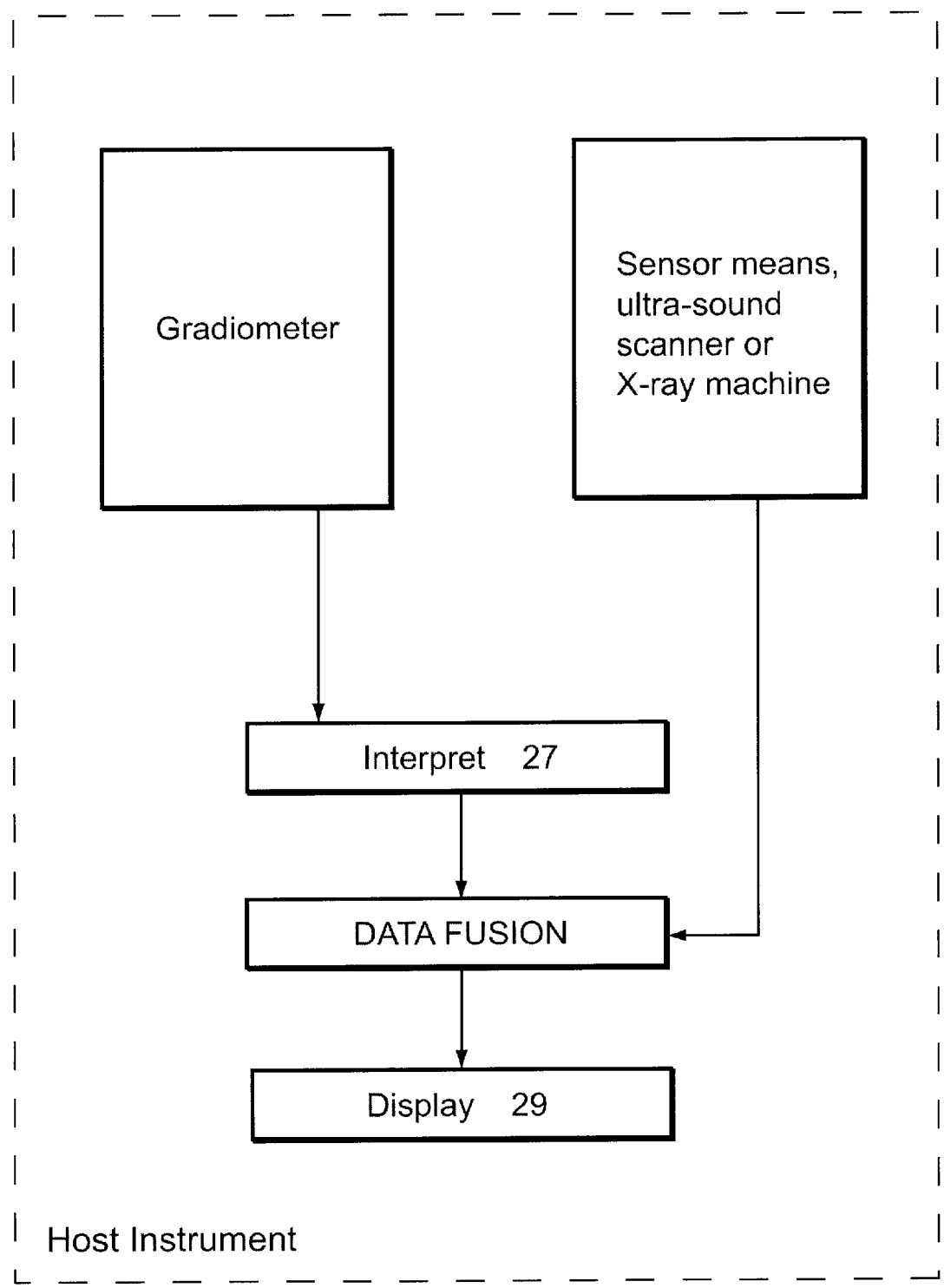
FIG. 8 is a block diagram of a further embodiment of the present invention.

If a host system or instrument is used in addition to the metal detector, such as an ultra-sound scanner or X-ray tomography machine, the software 27 and display 29 may be part of the host system. As shown in FIG. 8, the present invention gradiometer may be combined with the output from another sensor means such as an ultra-sound scanner or an X-ray tomography machine. As in the previous application, user criteria (not shown in this figure) may be selected and input to the interpretative software 27 so specific targets may be selected or rejected. If there is a host system, data may also be integrated in software 31 with data from the host instrument. The detector may therefore share processor time and display with the host instrument.

For applications where foreign metal objects are to be located on or within a human or animal body, typically the baseline will need to be smaller than for application A above, as the metal to detector distance is much smaller. Typically, the baseline in this case may be 1–5 centimeters. The present invention could also act as a more accurate receiver for medical tube location applications, WO 95/08130.

(C) Security application

Another application for which the apparatus may be used is in a security system, such as that used at an airport. Conventionally, walk-through archway detectors are used to detect whether a metal is present on or carried by a person passing through. For more accurate location of the metal a hand-held detector needs to be passed close to the body. The present invention would enable location of the metal object more accurately, therefore providing a less-intrusive detection means. U.S. Pat. No. 5,498,959 describes an advanced archway metal detector that can localise targets into broad zones and can cope with multiple targets simultaneously. The present invention would locate multiple targets more accurately and provide a useful level of discrimination.

Other security applications include searching for hidden hypodermic needles in prisons/institutions, and locating hidden wires.

What is claimed is:

1. Apparatus for detecting a metal object having a shape, an electro-magnetic cross-section and a location comprising;
    transmitter means for generating a time varying magnetic field in the vicinity of the metal object to be detected, thereby inducing currents within the metal object, the induced currents generating a secondary magnetic field,
    detection means for measuring at least three magnetic field gradient components of at least first order of the secondary magnetic field,
    processing means for determining at least one of the location, the electro-magnetic cross-section, and an estimate of the shape of the metal object from the measured first order magnetic field gradient components, and
    adaptive signal processing means for adaptively correcting offsets in the measured magnetic field gradient components.

2. The apparatus of claim 1, comprising means for generating a pulsed magnetic field.

3. The apparatus of claim 1, comprising means for generating an alternating magnetic field.

4. The apparatus of claim 1 comprising means for measuring at least five magnetic field gradient components of at least first order, and further comprising sensing means for measuring one or more component of the secondary magnetic field.

5. The apparatus of claim 4, wherein the sensing means comprise any one of a coil, a SQUID, a fluxgate, a Hall probe, a magneto-resistive device or a magneto-impedance device.

6. The apparatus of claim 1, wherein the processing means includes a least squares fit to one or more classic dipole sources.

7. The apparatus of claim 1, wherein the processing means includes a least squares fit to a multi-pole magnetic source.

8. The apparatus of claim 1, wherein the processing means includes a least squares fit to extended source models.

9. The apparatus of claim 1 comprising means for measuring at least three magnetic field gradient components of second order.

10. The apparatus of claim 1, comprising at least three pairs of gradiometric receiver coils, each pair for detecting a different first order magnetic field gradient component, each of the gradiometric coil pairs having a baseline, d.

11. The apparatus of claim 1, comprising at least three pairs of any one of SQUIDs, fluxgates, Hall probes, magneto-resistive devices or magneto-impedance devices, each pair for detecting a different first order magnetic field gradient component, each of the pairs having a baseline, d.

12. The apparatus of claim 10 for locating a metal object buried beneath the surface of the earth.

13. The apparatus of claim 10 for characterising or deducing an estimate of the shape and composition of a metal object buried beneath the surface of the earth.

14. The apparatus of claim 10 for locating a metal object on or within a human or animal body.

15. The apparatus of claim 10 for characterising or deducing an estimate of the shape and composition of a metal object on or within a human or animal body.

16. The apparatus of claim 10 for locating a metal object inside or behind a wall, floor or ceiling.

17. The apparatus of claim 10 for characterising or deducing an estimate of the shape and composition of a metal object inside or behind a wall, floor or ceiling.

18. The apparatus of claim 14, and further comprising a host system, the host system being any one of an ultra-sound scanning apparatus or an X-ray imaging apparatus.

19. The apparatus of claim 1, wherein the transmitter means comprise a pulsed current source or an alternating current source and further comprising at least one transmitter coil.

20. The apparatus of claim 19, comprising at least two transmitter coils, wherein the two or more transmitter coils are arranged to generate a magnetic field in substantially orthogonal directions.

21. The apparatus of claim 19, the transmitter being arranged to generate a magnetic field at at least two frequencies.

22. The apparatus of claim 1, wherein the processing means include means for entering pre-determined criteria to provide a discrimination means against detection of metal objects of no interest.

23. The apparatus of claim 1, wherein the processing means include means for entering pre-determined criteria to provide a discrimination means to selectively detect metal objects of interest.

24. The apparatus of claim 1, the detection means generating at least three outputs corresponding to the three or more measured magnetic field gradient components, and further comprising phase detection means for determining the relative phase between the three or more gradient outputs and the magnetic field generated by the transmitter means, such that the relative phase provides a discrimination means or an additional discrimination means between metal objects of different type.

25. A detection system suitable for detecting a metal object on or within the human or animal body comprising a host instrument incorporating a plurality of sensor means wherein at least one of the sensor means includes an apparatus for detecting said metal object, said metal object having a shape, an electro-magnetic cross-section and a location, said apparatus comprising;

transmitter means for generating a time varying magnetic field in the vicinity of the metal object to be detected, thereby inducing currents within the metal object, the induced currents generating a secondary magnetic field, detection means, located within said time varying magnetic field, for detecting the secondary magnetic field, comprising at least three pairs of any one of gradiometric receiver coils, SQUIDS, fluxgates, Hall probes, magneto-resistive devices and magneto-impedance devices, each of said three pairs for measuring a different magnetic field gradient component of at least first order of the secondary magnetic field, each of the pairs having a baseline, d, processing means for determining at least one of the location or the electro-magnetic cross-section or an estimate of the shape of the metal object from the measured at least first order magnetic field gradient components, wherein data from the apparatus for detecting the metal object is integrated with data from another of said plurality of sensor means incorporated in the host instrument, and adaptive signal processing means for adaptively correcting offsets in the measured magnetic field gradient components.

26. A system according to claim 25 wherein the sensor means incorporated in the host instrument include any one of an ultra-sound scanning apparatus or an X-ray imaging apparatus.

27. A method for detecting a metal object having a shape, an electro-magnetic cross-section and a location comprising the steps of;

(i) generating a time varying magnetic field in the vicinity of the metal object to be detected, the magnetic field being any one of a pulsed or an alternating magnetic field, thereby inducing currents within the metal object, the induced currents generating a secondary magnetic field, (ii) detecting within said time varying magnetic field, the secondary magnetic field, (iii) measuring at least three magnetic field gradient components of at least first order of the secondary magnetic field, (iv) determining at least one of the location, an electro-magnetic cross-section and an estimate of the shape of the metal object from the measured magnetic field gradient components using processing means, and (v) adaptively correcting offsets in the measured magnetic field gradient components using adaptive signal processing means.

28. The method of claim 27, and further comprising the step of applying within the processing means at least squares fit to one or more classic dipole sources.

29. The method of claim 27, and further comprising the step of applying within the processing means a least squares fit to a multi-pole magnetic source.

30. The method of claim 27, and further comprising the step of applying within the processing means a least squares fit to extended source models.

31. The method of claim 27, and further comprising the step of entering pre-determined criteria to the processing means to provide a discrimination means against detection of metal objects of no interest.

32. The method of claim 27, and further comprising the step of entering pre-determined criteria to the processing means to provide a discrimination means to selectively detect metal objects of interest.

33. A method suitable for detecting a metal object having a shape, an electro-magnetic cross-section and a location on or within the human or animal body, using a host instrument including a plurality of sensor means, said method comprising the steps of;

(i) generating a time varying magnetic field in the vicinity of the metal object to be detected, the magnetic field being one of a pulsed and an alternating magnetic field, said time varying magnetic field inducing currents within the metal object, the induced currents generating a secondary magnetic field, (ii) detecting the secondary magnetic field in one of said plurality of sensor means, (iii) measuring, within said time varying magnetic field, at least three magnetic field gradient components of at least first order of the secondary magnetic field, (iv) determining at least one of the location, an electromagnetic cross-section and an estimate of the shape of the metal object from the measured magnetic field gradient components using processing means, (v) monitoring the human or animal body using at least one additional sensor means, (vi) integrating the data produced by the processing means with data from another of said plurality of sensor means, and (vii) adaptively correcting offsets in the measured magnetic field gradient components.

34. A method according to claim 33 wherein the at least one additional sensor means includes any one of an ultrasound scanning apparatus or an X-ray imaging apparatus.

* * * * *